(12) United States Patent
Shao

(10) Patent No.: US 8,316,502 B2
(45) Date of Patent: Nov. 27, 2012

(54) SPIN DRY MOP

(76) Inventor: Guofa Shao, Jiaxing (CN)

( * ) Notice: Subject to any disclaimer, the term of this patent is extended or adjusted under 35 U.S.C. 154(b) by 155 days.

(21) Appl. No.: 13/004,688

(22) Filed: Jan. 11, 2011

(65) Prior Publication Data

US 2012/0174335 A1   Jul. 12, 2012

(51) Int. Cl.
*A47L 13/20* (2006.01)
(52) U.S. Cl. .......... 15/119.1; 15/98; 15/120.1; 15/229.2
(58) Field of Classification Search ................ 15/25, 98, 15/119.1, 120.1, 120.2, 228; 34/58
See application file for complete search history.

(56) References Cited

U.S. PATENT DOCUMENTS

| 8,214,963 | B2 * | 7/2012 | Yu ................................ 15/119.1 |
| 2004/0031506 | A1 * | 2/2004 | Tsai .............................. 134/105 |
| 2011/0154602 | A1 * | 6/2011 | Chen ............................... 15/228 |
| 2011/0277259 | A1 * | 11/2011 | Chen ............................... 15/228 |
| 2012/0090122 | A1 * | 4/2012 | Lin ................................ 15/228 |

FOREIGN PATENT DOCUMENTS

CN   2009 2 0201153.7   11/2009
CN   2009 2 0201154.1   11/2009

* cited by examiner

*Primary Examiner* — Mark Spisich
*Assistant Examiner* — Michael Jennings
(74) *Attorney, Agent, or Firm* — Clement Cheng

(57) ABSTRACT

A spin dry mop includes an outer tube and a handle fitting over the outer tube. The handle is made of a different material than the outer tube. The inner tube is sized to fit telescopically within the outer tube. A fastness key is bonded to the handle and fits inside the outer tube. A corkscrew screw is made of a strip of flat metal having a plurality of turns. The fastness key is made of a different material than the corkscrew screw. The fastness key is bonded to the handle at a key top end and bonded to the corkscrew screw at a key lower end. A screw tube has a keyed opening with an internal profile of the corkscrew screw and receives the corkscrew screw within the keyed opening.

20 Claims, 6 Drawing Sheets

SPIN DRY MOP

FIELD OF THE INVENTION

The present invention relates to a spin dry mop.

DISCUSSION OF RELATED ART

Mops are commonly used in daily life and the most commonly used mop requires wringing water from the mop head after use which can be of some inconvenience. Certain variety of mops wring by pressing, but these mop heads are typically made up a sponge material which may not be good for absorbing or cleaning. Other mop heads are dried by treading on the metal which may also not be convenient.

Other spin dry mops include Palmer U.S. Pat. No. 7,174,601 issued Feb. 13, 2007, the disclosure of which is incorporated herein by reference. Palmer spins the mop head to dry it and Palmer discloses a spin dry mop which is externally driven by the bucket basket imparting a spin to the mop head. A variety of spin dry mops have been made in the prior art including those described in Fischer United States publication US2009/0307856 filed Apr. 24, 2006 having a handle and a multi-turn actuator, the disclosure of which is incorporated herein by reference. The present invention also employs a long screw shaped multiturn actuator for spinning the mop head. Fischer and the present invention are internally driven with a multiturn actuator in the handle.

SUMMARY OF THE INVENTION

The present invention has a spin dry feature with vertical actuated transmission for spinning drying a mop head. An object of the invention is to improve on existing technology. The upper and lower drive contain a rotating inner tube, and dehydration mop head. The mop is fixed on one side of the inner tube, and also contains a solid-key, sleeve, knob, positioning external set, screw, positioning internal set, edge coverage, threaded pipe, adapter sleeve and spacing collar. The solid-key is fixed in the sleeve, one side of the screw is fixed on the solid-key while the other side is fixed on the spacing collar. The threaded pipe has a driving rack and an adapter sleeve has a follower gear, edge coverage, threaded pipe and adapter sleeve are all installed in the screw. Threaded pipe is installed inside the adapter sleeve, and edge coverage is fixed on the adapter sleeve. The adapter sleeve is fixed inside the internal set, and one side of the positioning internal set is fixed under the sleeve, so that the other side has a valve body. Both the positioning internal set and the sleeve are fixed on the internal pipe. The positioning external pipe has an elliptical hole fixed on the pipe, having a U shaped knob. The knob is connected with the pipe by the screw, and the screw is fixed with the hole on the positioning external pipe. Both sides of the knob are fixed with the holes of the positioning external pipe.

The present invention uses rotation turns, and the outside edge of adapted pipe has boss club. The rotation turns is fixed on the adapted pipe, and the rotation turns locate on the top of the boss club and between the adapted pipe and the pipe. When spinning drying the mop head rotates with minimal internal friction between tube and casing.

The present invention includes a buffering carrier ring, it is fixed on the screw and between the solid-key and the edge coverage. So that the utility model reduces the noise caused by fixed key, and also reduces the impact force between solid-key and edge cover and extend the life of the product. The present invention includes a grip, which is fixed on the top of the pipe. The number of the valve body on the other side of the positioning internal pipe is arranged from three to five.

The present invention has an inner tube connected with the positioning internal pipe and the pipe, such that one side of the positioning internal pipe is fixed on the bottom of the pipe. The other side has at least two valve bodies. The positioning internal pipe and the pipe are fixed on the internal pipe. Fixing by positioning within the jacket can be put on the valve body clamping. Positioning within the valve body firmly put on the hoop tube, including the outer walls, and achieve the inner tube's function of positioning. The external pipe moves down or up controlled by the knob's up and down position, so that the inner tube is fixed by the positioning internal pipe.

A spin dry mop includes an outer tube and a handle fitting over the outer tube. The handle is made of a different material than the outer tube. The inner tube is sized to fit telescopically within the outer tube. A fastness key is bonded to the handle and fits inside the outer tube. A corkscrew screw is made of a strip of flat metal having a plurality of turns. The fastness key is made of a different material than the corkscrew screw. The fastness key is bonded to the handle at a key top end and bonded to the corkscrew screw at a key lower end. A screw tube has a keyed opening with an internal profile of the corkscrew screw and receives the corkscrew screw within the keyed opening. The screw tube has a plurality of screw tube engaging teeth at a lower end of the screw tube. A threading pipe has a plurality of threading pipe engaging teeth selectively engaging with the screw tube engaging teeth disposed on a lower portion of the screw tube. The threading pipe is connected to an upper end of the inner tube. An inner pipe extension connection is connected to a lower end of the inner pipe. The inner pipe extension connection includes an inner pipe extension connection internal thread disposed on an internal surface of the inner pipe extension connection. A mop attachment is mounted to the inner pipe extension connection.

Optionally, a locking device includes an inner positioning cover fitted within an outer positioning cover. The inner positioning cover includes an inner positioning cover cylindrical section fitting within an outer positioning cover cylindrical section and an inner positioning cover flare section fitting within an outer positioning cover flare section. The locking handle is swivel mounted to the outer positioning cover at a left connector and a right connector. The left connector and the right connector mount within a pair of vertical slots formed on the outer positioning cover. The locking handle is swivel mounted to the inner positioning cover at the left connector and the right connector. An end of the corkscrew screw receives a crimp expansion. The crimp expansion expands the cross-section of the corkscrew screw to retain the limit ring. The limit ring has a generally rectangular profile. The spin dry mop also includes a threading pipe abutment face in abutment with a top edge of the inner pipe; and a threading pipe interference face in abutment with an inside surface of the inner pipe.

A lower elastomeric buffer gasket can be mounted to abut and be supported by a limit ring mounted at a lower end of the corkscrew screw. The lower elastomeric buffer gasket is backed by a rigid rotary ring which is mounted above the lower elastomeric buffer. An end cover with an end cover bevel can be formed at a lower portion of the end cover, and the end cover can be mounted on the corkscrew screw at a position between an upper elastomeric buffer gasket and the screw tube. Preferably, the upper elastomeric buffer gasket is mounted concentric to the corkscrew screw.

Figure 1:
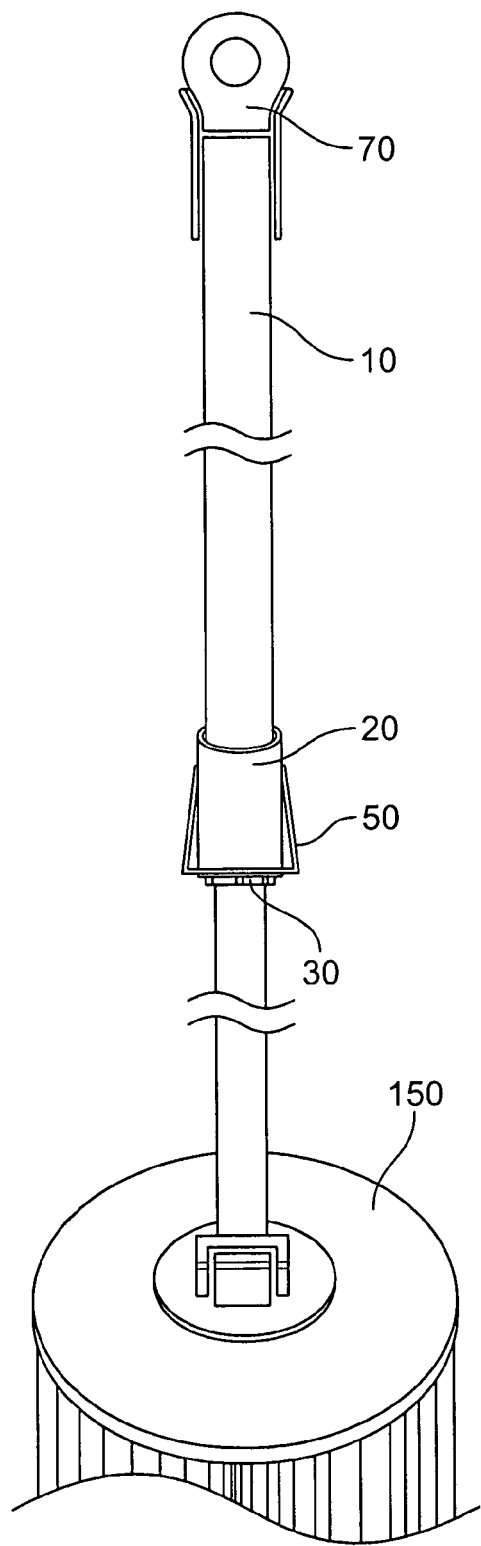
FIG. 1 is a diagram of the structure of the invention.

The following call out list of elements can be a useful guide in referencing the elements of the drawings.

10 Outer Casing Pipe
20 Outer Positioning Cover
30 Inner Positioning Cover
31 Inner Positioning Cover Flare Section
32 Inner Positioning Cover Cylindrical Section
40 Inner Pipe
50 Handle
60 Corkscrew Screw
61 Ridged Retainer
62 Bevel Face
63 Flare Section
64 Abutment Face
65 Vertical Slot
66 Corkscrew Turns
68 Machine Screw
70 Handle
80 Fastness Key
90 Buffer Gasket
91 Secondary Buffer Gasket
100 End Cover
101 End Cover Flange
102 End Cover Top Opening
103 End Cover Bevel
104 End Cover Vertical Face
110 Rotary Ring
120 Screw Tube
130 Threading Pipe
131 Threading Pipe Top Face
132 Threading Pipe Running Face
133 Threading Pipe Abutment Face
134 Threading Pipe Interference Face
135 Threading Pipe Top Opening
140 Limit Ring
141 Crimp Expansion
142 Interference Fit Section
143 Interference Fit Fingers
144 Interference Fit Slots
150 Mop Head
160 Inner Pipe Extension Connection
161 Inner Pipe Extension Connection Internal Thread
162 Inner Pipe Extension Connection Upper Edge
163 Inner Pipe Extension Connection Interference Section
164 Inner Pipe Extension Connection Lower Flange
165 Inner Pipe Extension Connection Slot

DETAILED DESCRIPTION OF THE PREFERRED EMBODIMENT

As seen in the figures, the upper and lower transmission rotary spin dry mop includes an outer casing pipe 10, outer positioning cover 20, inner positioning cover 30, inner pipe 40, handle 50, twisted strip 60, handle 70, fastness key 80, buffer gasket 90, end cover 100, rotary ring 110, screw tubes 120, threading pipe 130, limit ring 140 and mop head 150. The mop head 150 is installed on the lower end of inner pipe 40. The mop head 150 can be made of a construction similar to currently existing methods such as by stranded absorbent material. The casing pipe 10 is matched in size with inner pipe 40, such that casing pipe 10 can be telescopic with inner pipe 40. Preferably, the diameters are matched accordingly. The shape and size of outer positioning cover 20 and positioning cover 30 are also matched with each other.

The fastness key 80 is fixed in the casing pipe 10. One end of screw 60 is fixed on fastness key 80, which integrates the screw 60 and casing pipe 10. The motion of casing pipe 10 can drive screw 60 in a vertical motion such that it can move up and down. Limit ring 140 is fastened on the other end of screw 60. The outside thread of screw tubes 120 is the same to the inside thread of screw 60. An initiative gear is set on the bottom surrounding of screw tubes 120, which is triangle-shaped, and under the upper bottom of threading pipe 130, there is a driven gear matching it. End cover 100, screw tubes 120, and threading pipe 130 are all sleeved on the screw 60. Screw tubes 120 is fixed in the threading pipe 130, and the initiative gear on it is meshes the driven gear, thus the rotation of screw tubes 120 can bring the threading pipe 130 rotate. End cover 100 is fixed on the top of threading pipe 130, and with it, the screw tubes 120 is located in threading pipe 130. The threading pipe 130 is fastened in inner pipe 40, and the rotation of threading pipe 130 can actually the inner pipe 40 to rotate.

A circumferential embossment may be set on threading pipe 130. Turning circle 110 is preferably sleeved on threading pipe 130 at a position above the embossment and between the threading pipe 130 and the casing pipe 10, with the goal of reducing rotational frictional resistance between them. The buffer gasket 90 is sleeved on screw 60, between fastness key 80 and end cover 100. The buffer gasket 90 may effectively reduce impact between fastness key 80 and end cover 100 and also impact noise. The handle 70 is fixed on casing pipe 70.

One head of inner positioning cover 30 is fixed on the casing pipe 10, and the inner positioning cover 30 is fixed on the extine of casing pipe 10. Also the inner positioning cover 30 can be fixed to casing pipe 10. In the other head of inner positioning cover 30, there are four evenly fixed petals, and there are four gaps that make the petals on the end of inner positioning cover 30. This allows adapting the pipe diameter of inner positioning cover 30 with the expandable function, so that it can anchor the pipe fixed on inner positioning cover 30 under external force. In this utility model, the number of petals on the end of inner positioning cover 30 is at least two, and preferably between three and five.

Two oval positioning holes are disposed for positioning outer positioning cover 20 setting on case pipe 10. The lower portion of outer positioning cover 20 is for setting on inner positioning cover 3 which fixed in casing pipe 10. The valve body and diameter in the other end of inner positioning cover 30 can be pulled back by moving down outer positioning cover 20. Handle 50 is shown as a U-shape and is hinged on casing pipe 10 through two machine screws 68 which access the two positioning holes on outer positioning cover 20 respectively. The ends of handle 50 are also located in the two positioning holes of outer positioning cover 20. The ends of handle 50 will produce a force on outer positioning cover 20 when raised or lowered and the outer positioning cover 20 will move in the opposite direction. For example, if handle 50 is raised, the outer positioning cover 20 will be squeezed by the ends of handle 50 and move down in proportion to the downward force produced by outer positioning cover 20.

The casing pipe 10 and inner positioning cover 30 are all sleeved on inner pipe 40. If a user pulls the handle 50 down, handle 50 generates a force on outer positioning cover 20, and makes it slightly higher along the casing pipe 10, so that it can decrease the extruding force on four petals generated by outer positioning cover 20.

When the anchor force generated by four petals on inner pipe 40 is reduced the inner pipe 40 can move between casing pipe 10 and outer positioning cover 20. When the handle 50 moves up, it can produce a force moving downward on outer positioning cover 20, so that the force will make outer positioning cover 20 slightly lower along casing pipe 10. The four petals of inner positioning cover 30 then bear more extruding force from outer positioning cover 20. This in turn tightens the anchor such that the anchor force generated by four petals on inner pipe 40 is increased, and the inner pipe 40 is anchored firmly in the inner positioning cover 30.

If the head of mop is drenched, the user will pull-down the handle 50, then the anchor strength on inner pipe 40 generated by inner positioning cover 30 decreases, and it allows the casing pipe 10 engage in reciprocating motion relative to inner pipe 40. When the casing pipe 10 moves down, it brings screw 60 the down. Under the pressure of screw 60, the initiative gear in the bottom of screw 120 meshes the driven gear on threading pipe 130. The screw 60 makes the screw tube 120 rotate when it moves down, and also screw tube 120 will engage the threading pipe 130 to rotate. When the threading pipe 130 makes the inner pipe 40 rotate the inner pipe 40 makes the head of mop 150 rotate, and with these actions, the wringing spin function of head of mop 150 is achieved.

When casing pipe 10 moves down to the lowest position, fastness key 80 hits the buffer gasket 90, and the buffer gasket 90 hits the end cover 100. Then casing pipe 10 moves up, and screw 60 is up too, and the initiative gear in the bottom of screw tube 120 leaves the driven gear on the threading pipe 130 by the upward force of screw 60. That is to say the casing of casing pipe 10 moves up, screw tube 120 is idling in threading pipe 130. When casing pipe 10 moves down to the highest, the limit ring 140 fixed on screw 60 prop on the bottom of threading pipe 130, which prevents screw 60 extracting from inner pipe 40. Casing pipe 10 is pushed down again, which spin dries the head of mop 150 by rotation.

Figure 2:
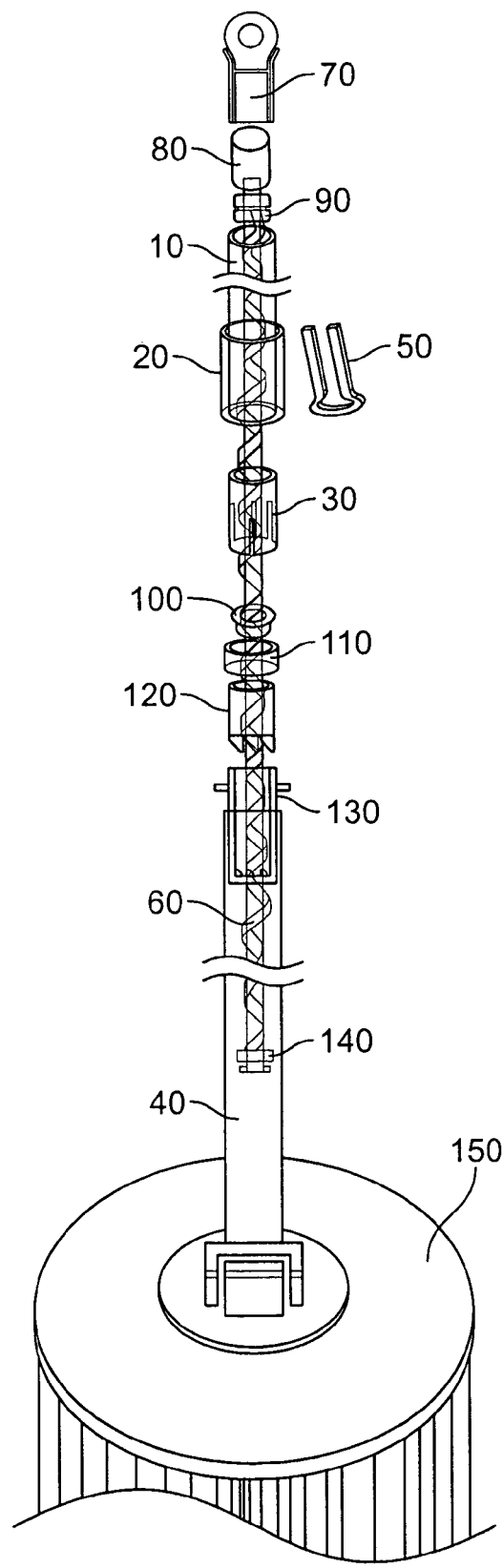
FIG. 2 is an exploded view diagram of the present invention.
Figure 3:
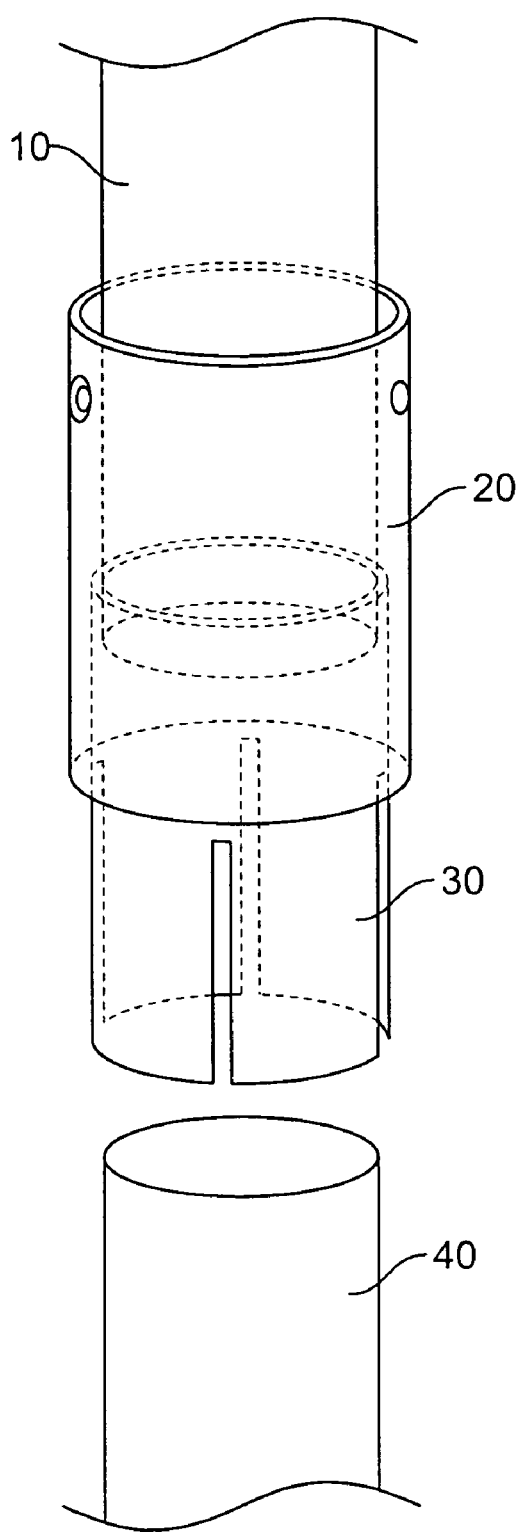
FIG. 3 is close-up view of the outer pipe, positioning external pipe, positioning internal pipe and inner tube.
Figure 4:
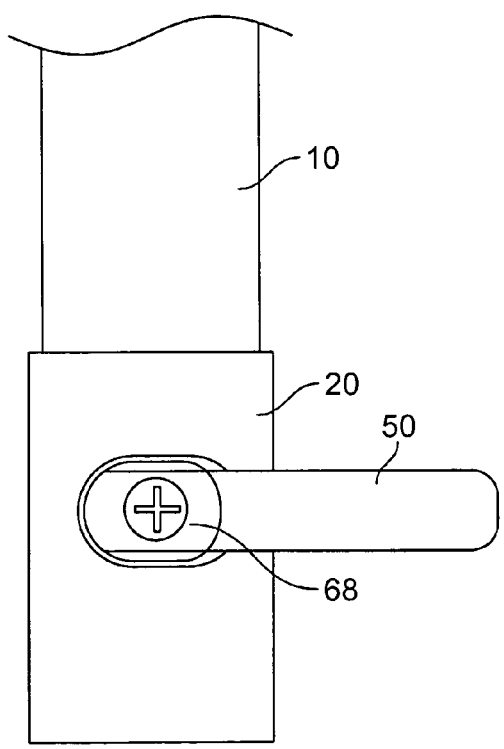
FIG. 4 is close-up view of the positioning outer pipe and the knob fixed on the pipe.
Figure 5:
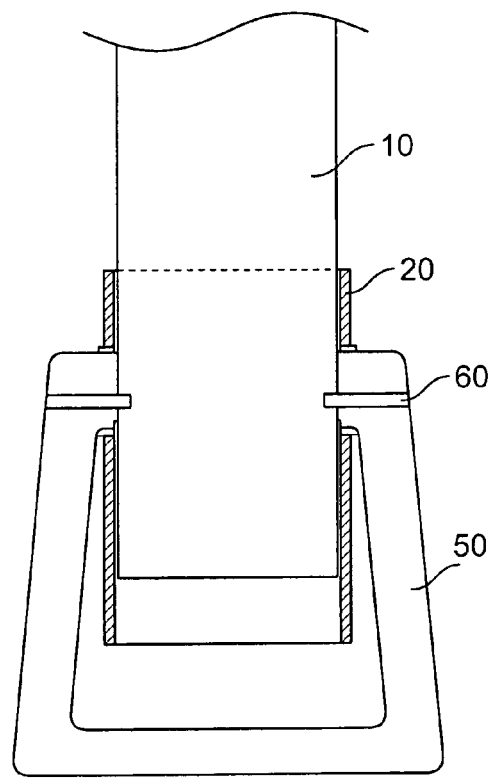
FIG. 5 is close-up view of the positioning outer pipe and the knob fixed on the pipe.
Figure 6:
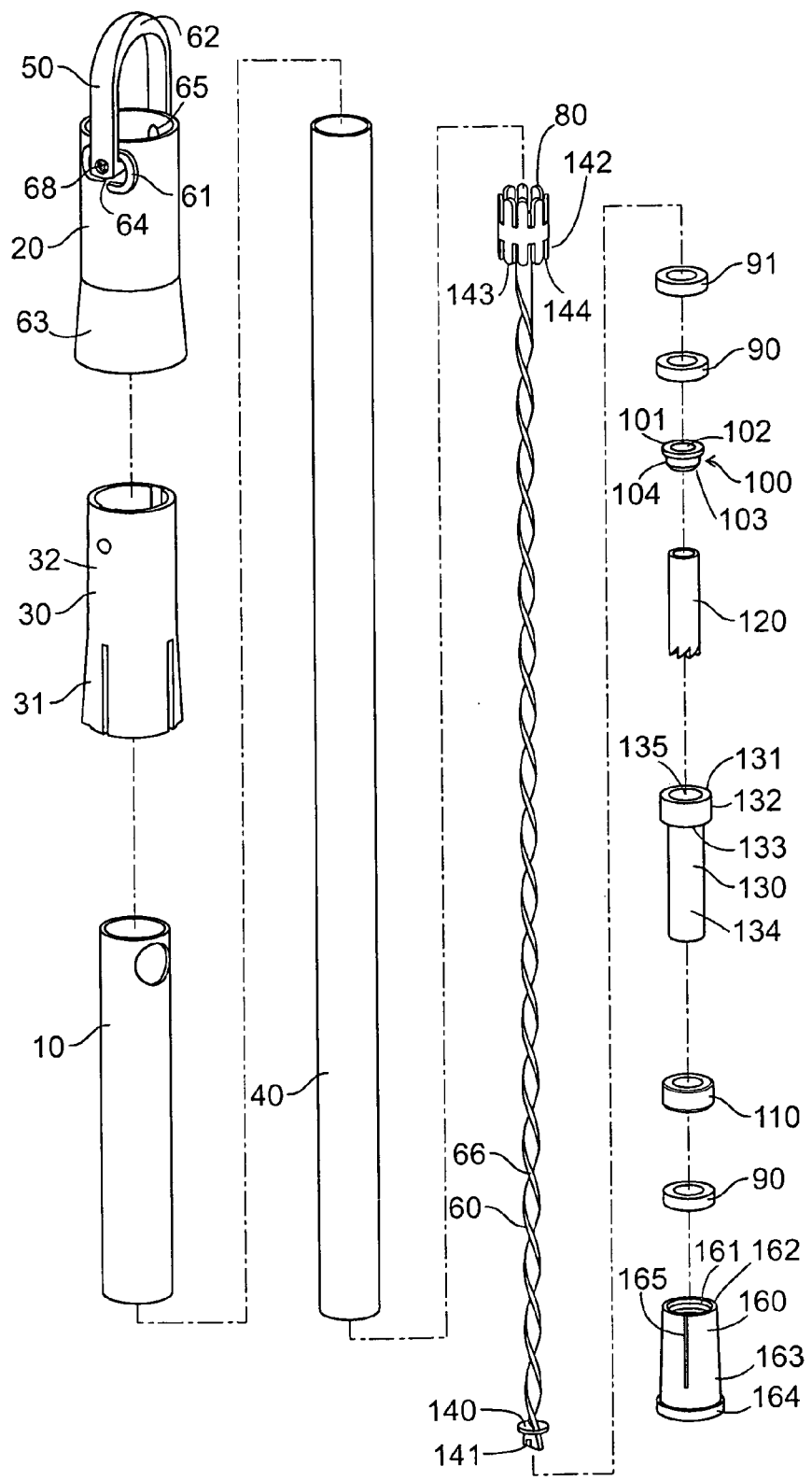
FIG. 6 is a perspective exploded view of the present invention.
Figure 7:
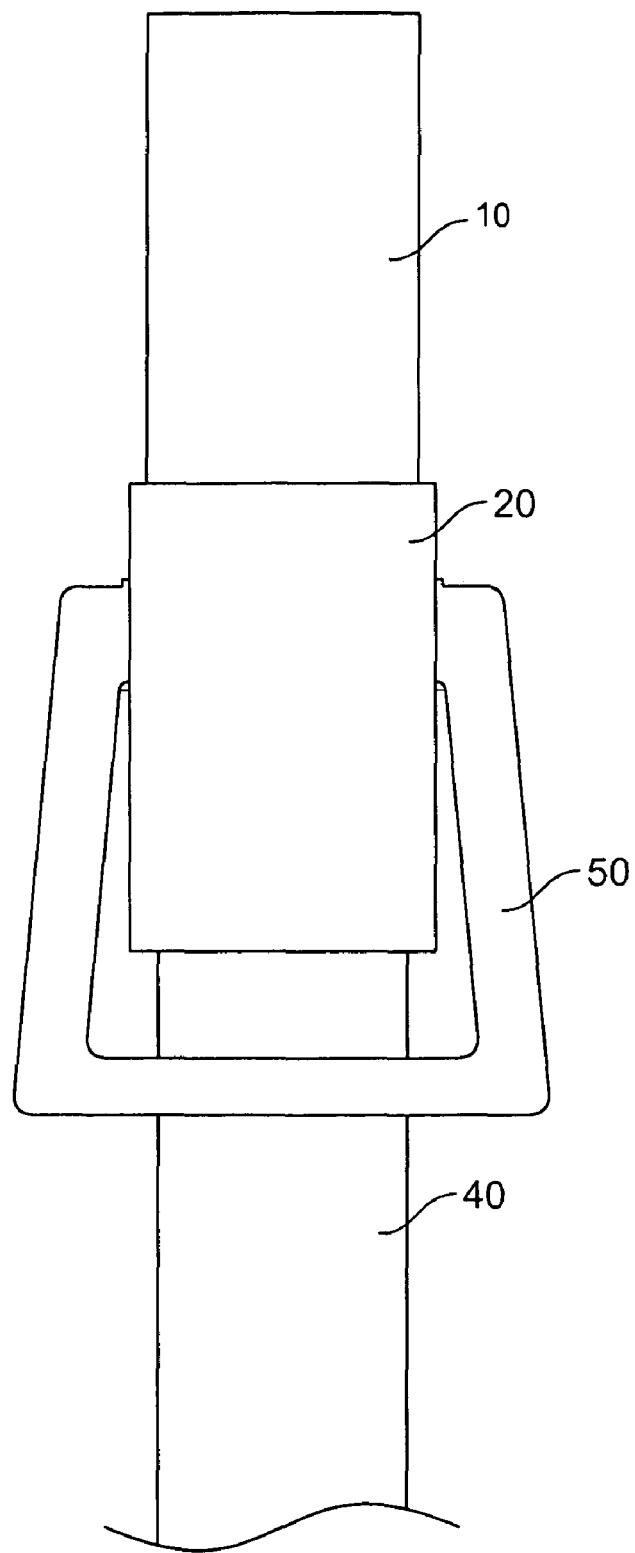
FIG. 7 is a diagram of the present invention.

In a first embodiment of the present invention as seen in FIG. 2, the corkscrew screw 60 is formed as a strip of metal wrapped about a long cylindrical rod, or a helical groove cut into a cylindrical rod. In a preferred second embodiment of the present invention as seen in FIG. 6, the corkscrew screw 60 is formed as a corkscrew screw made of a strip of flat metal having a plurality of turns. Preferably, there are approximately eighteen corkscrew turns 66. The strip of flat metal is preferably engaged with the fastness key 80 which is preferably made of plastic.

The key 80 is preferably molded around a top of the strip of flat metal so that they are bonded together though they are made of different materials. The key 80 further includes a number of fingers and grooves between the fingers. The key 80 has an interference fit section 142 comprised of a number of fingers extending downward and upward from a medium section. The interference fit fingers allow expansion and resilient spring interaction with an inside surface of the top of outer casing pipe 10. The interference fit fingers may also be molded with a handle that fits over the top of outer casing pipe 10. Between each of the interference fit fingers 143 are interference fit slots 144.

At the bottom of the corkscrew screw is preferably a limit ring 140 which is retained at a bottom end of the corkscrew screw by a crimp expansion 141 which deforms the bottom of the corkscrew screw so that the limit ring does not fall off. The limit ring 140 has a slot in it which receives the corkscrew screw, but is not large enough to pass over the crimp expansion 141. The limit ring slot is preferably rectangular in shape.

The locking handle 50 preferably has a bevel face 62 which is a flat surface allowing manual depression. The handle 50 is mounted in a vertically sliding slot which is a vertical slot 65 formed on the outer positioning cover 20. The outer positioning cover 20 also has a ridged retainer 61 the ridged retainer forms a pill shaped recess so that an abutment face 64 may abut against an inside wall or inside surface of the ridged retainer 61 to bias the inner positioning cover up and down relative to the slot 65.

The machine screw 68 attaches the handle 52 the inner positioning cover 30. The inner positioning cover 30 includes an inner positioning cover cylindrical section 32 as well as an inner positioning cover flare section 31 below the inner positioning cover cylindrical section 32. The inner positioning cover flare section 31 has a larger diameter than the cylindrical section 32. When the handle 50 is rotated, the abutment face 64 pushes against the ridged retainer 61 which draws the inner positioning cover 30 upward. When the inner positioning cover 30 is drawn up, the inner positioning cover flare section 31 is biased against the flare section 63 of the outer positioning cover 20 so that the inner positioning cover 30 clamps onto the inner pipe 40 so that the inner pipe 40 does not move in this clamped position.

The buffer gasket 90 can be backed by a secondary buffer gasket 91. The end cover 100 is preferably formed with an end cover flange 101 which extends circumferentially from an end cover top opening 102. The end cover vertical face 104 fixed inside threading pipe top opening 135. The end cover 100 preferably has an end cover vertical face 104 which terminates at an end cover bevel 103.

The screw tube 120 has an internal thread that matches the profile of the screw 60 with some slack. The screw tube is preferably pressed into the threading pipe top opening 135 by the end cover bevel 103 bottom surface.

The threading pipe top opening 135 forms a threading pipe top face 131 which preferably matches and abuts the end cover flange 101. The threading pipe running face 132 is preferably cylindrical in shape such that it rides along and inside of the outer pipe 10. The threading pipe abutment face 133 engages a top edge of the inner pipe 40. The threading pipe interference face 134 is pressed into a top end of the inner pipe 40. The inner pipe 40 is preferably made of aluminum and the interference face 134 is preferably made of a plastic.

The rotary ring 110 preferably is made of a hard piece of plastic and abutting the buffer gasket 90 which is preferably elastomeric material.

The inner pipe extension connection 160 is mounted to the bottom end of the inner pipe 40. The inner pipe extension connection 160 has preferably an inner pipe extension connection slot 165 and a plurality of inner pipe extension connection interference sections 163 which can fit against the inside surface of the lower portion of the inner pipe 40. The inner pipe extension connection 160 also includes an inner pipe extension connection internal thread 161 which allows receiving of a variety of attachments to the thread. The inner pipe extension connection 160 also has an inner pipe extension connection upper edge 162 which fits inside of the inner pipe 40. The inner pipe extension connection also has an inner pipe extension connection lower flange 164 which is preferably made of a plastic material. The tube sections are preferably made of aluminum.

Although the invention has been disclosed in detail with reference only to the preferred embodiments, those skilled in the art will appreciate that various other embodiments can be provided without departing from the scope of the invention. Accordingly, the invention is defined only by the claims set forth below.

The invention claimed is:

1. A spin dry mop comprising:
   a. an outer tube;
   b. a handle fitting over the outer tube and made of a different material than the outer tube;
   c. an inner pipe sized to fit telescopically within the outer tube;
   d. a fastness key bonded to the handle and fitting inside the outer tube;
   e. a corkscrew screw made of a strip of flat metal having a plurality of turns, wherein the fastness key is made of a different material than the corkscrew screw, wherein the fastness key is bonded to the handle at a key top end and bonded to the corkscrew screw at a key lower end;
   f. a screw tube having a keyed opening with an internal profile of the corkscrew screw and receiving the corkscrew screw within the keyed opening, wherein the screw tube has a plurality of screw tube engaging teeth at a lower end of the screw tube;
   g. a threading pipe having a plurality of threading pipe engaging teeth selectively engaging with the screw tube engaging teeth disposed on a lower portion of the screw pipe, wherein the threading pipe is connected to an upper end of the inner tube;
   h. the inner pipe extension connection connected to a lower end of an inner pipe, wherein the inner pipe extension connection includes an inner pipe extension connection internal thread disposed on an internal surface of the inner pipe extension connection;
   i. a mop attachment mounted to the inner pipe extension connection.

2. The spin dry mop of claim 1, further comprising:
   a. a threading pipe abutment face in abutment with a top edge of the inner pipe; and
   b. a threading pipe interference face in abutment with an inside surface of the inner pipe.

3. The spin dry mop of claim 1, further comprising: a lower elastomeric buffer gasket mounted to abut and be supported by a limit ring mounted at a lower end of the corkscrew screw, wherein the lower elastomeric buffer gasket is backed by a rigid rotary ring which is mounted above the lower elastomeric buffer.

4. The spin dry mop of claim 1, further comprising an end cover with an end cover bevel at a lower portion of the end cover, wherein the end cover is mounted on the corkscrew screw at a position between an upper elastomeric buffer gasket and the screw tube, wherein the upper elastomeric buffer gasket is mounted concentric to the corkscrew screw.

5. The spin dry mop of claim 1, further comprising: a locking device comprising an inner positioning cover fitted within an outer positioning cover, wherein the inner positioning cover includes an inner positioning cover cylindrical section fitting within an outer positioning cover cylindrical section and an inner positioning cover flare section fitting within an outer positioning cover flare section.

6. The spin dry mop of claim 5, further comprising:
   a. a threading pipe abutment face in abutment with a top edge of the inner pipe; and
   b. a threading pipe interference face in abutment with an inside surface of the inner pipe.

7. The spin dry mop of claim 5, further comprising: a lower elastomeric buffer gasket mounted to abut and be supported by a limit ring mounted at a lower end of the corkscrew screw, wherein the lower elastomeric buffer gasket is backed by a rigid rotary ring which is mounted above the lower elastomeric buffer.

8. The spin dry mop of claim 5, further comprising an end cover with an end cover bevel at a lower portion of the end cover, wherein the end cover is mounted on the corkscrew screw at a position between an upper elastomeric buffer gasket and the screw tube, wherein the upper elastomeric buffer gasket is mounted concentric to the corkscrew screw.

9. The spin dry mop of claim 1, further comprising: a locking device comprising an inner positioning cover fitted within an outer positioning cover, wherein the inner positioning cover includes an inner positioning cover cylindrical section fitting within an outer positioning cover cylindrical section and an inner positioning cover flare section fitting within an outer positioning cover flare section; wherein a locking handle is swivel mounted to the outer positioning cover at a left connector and a right connector, wherein the left connector and the right connector mount within a pair of vertical slots formed on the outer positioning cover, wherein the locking handle is swivel mounted to the inner positioning cover at the left connector and the right connector.

10. The spin dry mop of claim 9, further comprising:
    a. a threading pipe abutment face in abutment with a top edge of the inner pipe; and
    b. a threading pipe interference face in abutment with an inside surface of the inner pipe.

11. The spin dry mop of claim 9, further comprising: a lower elastomeric buffer gasket mounted to abut and be supported by a limit ring mounted at a lower end of the corkscrew screw, wherein the lower elastomeric buffer gasket is backed by a rigid rotary ring which is mounted above the lower elastomeric buffer.

12. The spin dry mop of claim 9, further comprising an end cover with an end cover bevel at a lower portion of the end cover, wherein the end cover is mounted on the corkscrew screw at a position between an upper elastomeric buffer gasket and the screw tube, wherein the upper elastomeric buffer gasket is mounted concentric to the corkscrew screw.

13. The spin dry mop of claim 1, further comprising: a locking device comprising an inner positioning cover fitted within an outer positioning cover, wherein the inner positioning cover includes an inner positioning cover cylindrical section fitting within an outer positioning cover cylindrical section and an inner positioning cover flare section fitting within an outer positioning cover flare section; wherein a locking handle is swivel mounted to the outer positioning cover at a left connector and a right connector, wherein the left connector and the right connector mount within a pair of vertical slots formed on the outer positioning cover, wherein the outer positioning cover further includes a ridged retainer abutting against an abutment face of the locking handle disposed on the outer positioning cover.

14. The spin dry mop of claim 13, further comprising:
    a. a threading pipe abutment face in abutment with a top edge of the inner pipe; and
    b. a threading pipe interference face in abutment with an inside surface of the inner pipe.

15. The spin dry mop of claim 13, further comprising: a lower elastomeric buffer gasket mounted to abut and be supported by a limit ring mounted at a lower end of the corkscrew screw, wherein the lower elastomeric buffer gasket is backed by a rigid rotary ring which is mounted above the lower elastomeric buffer.

16. The spin dry mop of claim 13, further comprising an end cover with an end cover bevel at a lower portion of the end cover, wherein the end cover is mounted on the corkscrew screw at a position between an upper elastomeric buffer gasket and the screw tube, wherein the upper elastomeric buffer gasket is mounted concentric to the corkscrew screw.

17. The spin dry mop of claim 1, further comprising: a locking device comprising an inner positioning cover fitted within an outer positioning cover, wherein the inner positioning cover includes an inner positioning cover cylindrical section fitting within an outer positioning cover cylindrical section and an inner positioning cover flare section fitting within an outer positioning cover flare section; wherein a locking handle is swivel mounted to the outer positioning cover at a left connector and a right connector, wherein the left connector and the right connector mount within a pair of vertical slots formed on the outer positioning cover, wherein an end of the corkscrew screw receives a crimp expansion, wherein the crimp expansion expands the cross-section of the corkscrew screw to retain a limit ring, wherein the limit ring has a generally rectangular profile.

18. The spin dry mop of claim 17, further comprising:
 a. a threading pipe abutment face in abutment with a top edge of the inner pipe; and
 b. a threading pipe interference face in abutment with an inside surface of the inner pipe.

19. The spin dry mop of claim 17, further comprising: a lower elastomeric buffer gasket mounted to abut and be supported by the limit ring mounted at a lower end of the corkscrew screw, wherein the lower elastomeric buffer gasket is backed by a rigid rotary ring which is mounted above the lower elastomeric buffer.

20. The spin dry mop of claim 17, further comprising an end cover with an end cover bevel at a lower portion of the end cover, wherein the end cover is mounted on the corkscrew screw at a position between an upper elastomeric buffer gasket and the screw tube, wherein the upper elastomeric buffer gasket is mounted concentric to the corkscrew screw.

* * * * *